Nov. 12, 1963    E. M. HETH ETAL    3,110,330
MOUNTING FOR LATHE SPINDLES
Filed April 10, 1961
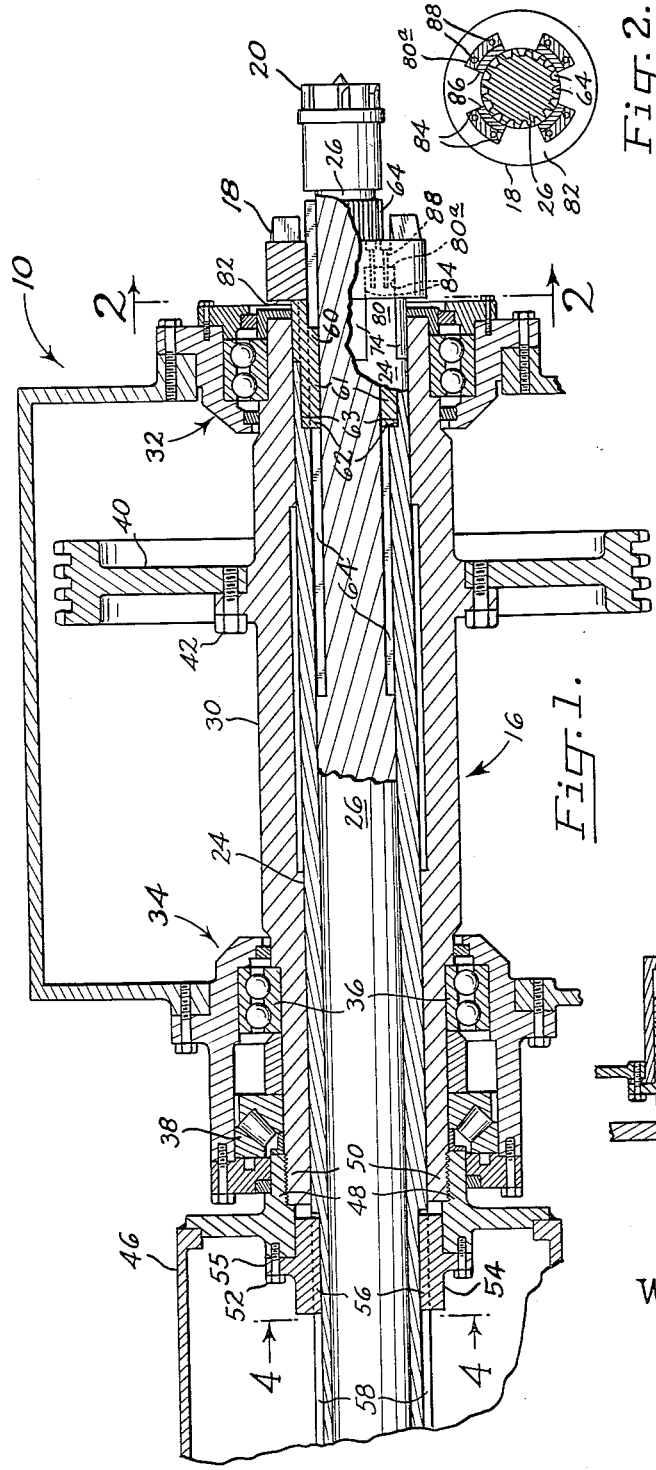
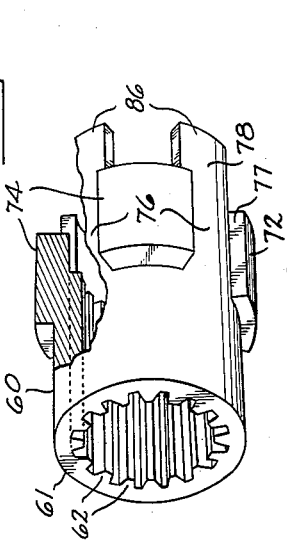
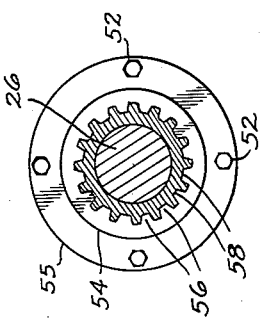
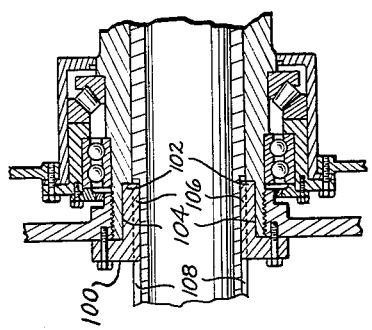
Edwin M. Heth
William J. Lofstedt
INVENTORS
BY Ramsey and Kolisch
Attys.

United States Patent Office 3,110,330
Patented Nov. 12, 1963

3,110,330
MOUNTING FOR LATHE SPINDLES
Edwin M. Heth and William J. Lofstedt, Portland, Oreg., assignors to Premier Gear & Machine Works, Inc., Portland, Oreg., a corporation of Oregon
Filed Apr. 10, 1961, Ser. No. 102,056
7 Claims. (Cl. 144—209)

This invention relates to lathes, and more particularly to an improved mounting and drive construction for the spindles in a lathe.

In the usual veneer lathe, opposed, power-driven, rotatable chucks bite the ends of a log during the cutting of veneer therefrom. These chucks are shifted axially away from each other to retract them from the ends of a log when releasing the log. Conversely, the chucks are shifted axially forwardly and into the ends of a log when a new log is readied in the lathe for cutting. Thus, in the mounting for the usual spindles that mount such chucks, there is the requirement that axial movement be provided the spindles, and that drive mechanism be included for rotating the spindles under power. Some lathes are provided with double chuck assemblies, i.e., an assembly including a smaller, inner chuck used to support a log for the final cutting of veneer, and a larger, outer chuck concentric with the smaller one, used, either alone or with the inner chuck, in holding the log during initial cutting. In such an organization, relative axial movement of the spindles of the two chucks may occur at the same time that a torque is applied to the spindles, introducing the necessity of adequately taking care of stresses that result.

As a further consideration in lathe construction, it should be remembered that the usual "peeler" log has considerable mass and bulk. Also, during cutting, a log is subjected to external forces applied thereagainst, as by the knife and pressure bar in a lathe. Because a log is subjected to such forces, and because of its considerable weight, provision must be made for adequately supporting the chuck spindles, particularly in the extended positions they have when holding the ends of a log.

Generally, it is an object of this invention to provide an improved mounting for a spindle in a lathe, that enables a driving torque to be applied to the spindle and also accommodates axial shifting of the spindle, which is characterized by features making it relatively trouble-free in operation and contributing to low maintenance costs.

Another object is to provide an improved drive construction for a spindle in a lathe, that employs an annular member detachably secured to a driving member for the spindle, provided with integral splines distributed circumferentially about the inside thereof. The splines fit within complementary elongated grooves provided upon the outside of the spindle. The annular member is relatively easily manufactured with an accurate profile, whereby its splines fit snugly and wtihout looseness in the grooves of the spindle. Since the member is detachable, it is easily replaced when such is necessary. Replacement is needed only infrequently, since the exactness of fit possible minimizes chewing and other wear tendencies. The annular member is secured to the driving member in such a manner that looseness between the parts is eliminated.

Another object is to provide an improved bushing construction for an axially shiftable inner spindle mounted within an outer spindle. The bushing performs a centering action, and is made of a bearing material, such as bronze, and is replaceable.

A further feature of the invention is the provision of such a bushing, in a lathe, which is a splined member and performs a drive-transmitting function.

A further feature and object of the invention is the provision of a novel bushing for one set of spindle ends in a double spindle construction, where the bushing is part of means connecting a chuck to one of the spindles.

A related object is to provide an improved connection between the outer spindle of a double spindle construction and a chuck driven by the outer spindle.

Other features and objects of the invention will become more fully apparent, as the following description is read in conjunction with the accompanying drawings, wherein:

FIG. 1 illustrates portions of a pedestal in a lathe, with parts removed to illustrate details;

FIG. 2 is a cross-sectional view, taken along the line 2—2 in FIG. 1;

FIG. 3 is an enlarged perspective view of a bushing in the lathe;

FIG. 4 is a cross-sectional view, taken along the line 4—4 in FIG. 1; and

FIG. 5 illustrates a modified form of construction.

Referring now to the drawings, 10 indicates a stationary pedestal in a veneer lathe, such usually being supported on a suitable base frame (not shown). In the usual veneer lathe, there are two of such pedestals, spaced opposite to each other, and a log that is to be cut is placed between the pedestals. The other pedestal is not shown in the drawings, as it is substantially the same as the one to be described, and its inclusion would add little to an understanding of the invention.

Journaled in pedestal 10 is a double spindle construction 16, having one set of ends outside the pedestal and to the right in FIG. 1, with chucks 18, 20 secured to the ends of this set. The larger chuck 18 is used together with chuck 20 (the smaller chuck), to hold a log during initial cutting when it has a relatively large diameter. As the diameter of the log decreases with cutting of veneer therefrom, the larger chuck is retracted, leaving only the smaller chuck 20 holding the log. Retraction gives suitable clearance for the knife cutting the veneer, enabling it to move inwardly to a greater degree, and enabling, therefore, the production of more veneer from the log. Spindle construction 16 comprises a tubular outer spindle or sleeve 24, and an inner spindle 26.

The two spindles are shiftable axially relative to each other, so that they can be retracted and extended in the release and gripping of a log, respectively. The spindles also are rotated under power, as previously indicated. The mounting for the spindles, which accommodates this relative axial movement and enables them also to be rotated under power, will now be described.

Referring again to FIG. 1, at 30 there is indicated an elongated hollow sleeve or quill that extends horizontally between the sides of pedestal 10 and that has spindles 24, 26 mounted within it. The quill, and thus the spindles 24, 26, is journaled within pedestal 10, by means of bearing assembly 32 supporting the right end of the quill in FIG. 1, and bearing assembly 34 supporting the left end of the quill in the figure. Bearing assembly 34 includes a radial bearing 36, and a thrust bearing 38.

Quill 30 is axially stationary in the pedestal. The quill is rotated under power by means of an enlarged gear 40 encircling the quill intermediate its ends, and secured thereto as by screws 42. A suitable drive chain (not shown) is trained over this gear, such chain being driven as by a power-driven drive gear disposed at the base of the pedestal (also not shown).

In the drawings, 46 indicates an elongated hollow cylindrical casing which is secured to quill 30 as by internally threaded portion 48 which is screwed onto an externally threaded portion 50 of the quill. The casing, through its connection with the quill, is rotatable with the quill, and also is axially stationary. Spindles 24, 26 extend out to the left in FIG. 1 and into the interior of casing 46, where they terminate at a set of ends (not shown) which are connected to hydraulic rams and the like for producing relative axial shifting of the spindles. Such rams are not illustrated as they do not concern the mounting construction of the spindles which is the subject of this invention. A construction for the rams and the casing, however, is shown in a copending application entitled Double Spindle Lathe, filed March 7, 1961, now Patent No. 3,073,363.

Considering first of all the mounting of outer spindle 24 in quill 30, and the embodiment of the invention illustrated in FIGS. 1 through 4, adjacent the left end of quill 30 in FIG. 1 and secured to casing 46 by screws or detachable fasteners 52 (and thus secured to the quill) is an annular member 54 encircling the outer spindle. Screws 52 securing the member in place extend through an annular flange 55 projecting radially out from member 54. As can be seen in FIGS. 1 and 5, annular member 54 has extending axially along the inside thereof splines 56 integral with annular member 54. These splines fit snugly within elongated grooves 58 provided the outside of the outer spindle 24. The splines and grooves unite the quill and the outer spindle for simultaneous rotation, but accommodate relative axial movement between the two.

Adjacent the right end of quill 30 in FIG. 1, inner spindle 26 is mounted within the outer spindle through an annular member or bushing 60. The bushing is illustrated in perspective in FIG. 3. Bushing 60 has an end 61 that fits within an annular shelf 63 provided in the outer spindle. The bushing has circumferentially spaced about its interior, and extending axially therealong, splines 62 integral with the bushing. The splines fit snugly within elongated axial grooves 64 provided in the outside of spindle 26. The splines and grooves are operable to impart rotation of the bushing to the inner spindle, while accommodating axial shifting of the inner spindle relative to the bushing. Because of the snug fit of end 61 within shelf 63 and splines 62 in grooves 64, the bushing performs the function of centering the inner spindle in the outer spindle.

As perhaps most clearly illustrated in FIG. 3, about the periphery of bushing 60 is an annular flange means 72, defined by a series of equally circumferentially spaced projections 74 extending radially from the bushing. Projections 74 are separated by grooves 76 defined by shoulders 77 of the projections and surface portions 78. Grooves 76 accommodate elongated axially extending projections 80 extending from the end of the outer spindle and integral with the outer spindle. Projections 80 fit snugly within grooves 76, and are operable to impart the rotation of outer spindle 24 to bushing 60.

An inner face of chuck 18 is indicated at 82. With reference to FIGS. 1 and 2, inner face 82 of the chuck is provided with a series of axially extending recesses 84. These recesses are equally circumferentially spaced about the chuck, and receive end portions 80a of projections 80, as well as axially extending projections 86 of bushing 60 that underly projections 80. Projections 86 and end portions 80a in effect form lugs projecting in an axial direction into recesses 84 and providing a means whereby the rotation of the bushing and outer spindle is imparted to chuck 18.

Chuck 18 is secured to outer spindle 24 by screws or detachable fasteners 88 extending from the chuck 18 into the end portions 80a of projections 80. In the embodiment illustrated, two of these are provided each end portion. With the chuck fastened in place, bushing 60 is also in effect secured to the end of spindle 24.

A modification of the invention is illustrated in FIG. 5. Here the outer spindle is mounted in the quill using, instead of member 54, an annular bushing 100. This bushing member, like bushing member 60 just described, has an end portion 102 that has a snug fit within a counterbore 104 provided in the sleeve 30. On the inside of the bushing, and circumferentially spaced thereabout, are splines 106 integral with the bushing. These splines, as in the first embodiment, fit within grooves 108 provided in the outside of spindle 24. As in the case of bushing 60, the fit of the splines within the grooves is snug, and the bushing performs the function of centering the outer spindle in the quill, while accommodating axial shifting of the outer spindle relative to the quill. At the same time, bushing 100 is effective to impart the rotation of the quill to the outer spindle.

It will be noted that the invention contemplates a removable bushing (that can be manufactured as by hobbing to have an accurate profile) as the member with splines transmitting rotary movement, with such bushing secured in fixed position to the member driving it. Looseness is eliminated in the various parts, which minimizes chewing and wearing tendencies. The result is substantially trouble-free operation in a lathe.

The bushing, as in any bushing, may be made of bronze or other bearing material. In the event that it is needed to replace a bushing, it is easily detached by loosening the detachable fasteners or screws mentioned.

Considering the ends of the spindles that are secured to chucks 18 and 20, it will be noted that since the log is supported adjacent these ends of the spindles, and the spindles in operation are extended somewhat from the pedestal, it is these ends of the spindles that are subjected to the greatest loading. Bushing 60 provided between spindle 26 and outer spindle 24 at this set of ends is particularly advantageous, as it accommodates relative axial shifting over long operating periods, without wear, even under heavy loading.

Note also that the construction provides a positive drive connection between spindle 24 and chuck 18. Since projections 80 of spindle 24 and projections 86 of the bushing fit within recesses 84 of the chuck, these recesses in effect produce a "banding" effect about the periphery of the projections, whereby they are held in place and inhibited from twisting.

We claim:

1. In a lathe having a lathe pedestal and a power-driven elongated rotatable sleeve journaled on said pedestal, the improvement comprising an elongated chuck spindle mounted within said sleeve and shiftable axially relative to said sleeve, an annular member encircling said spindle having integral therewith plural axially extending splines distributed circumferentially about its interior, elongated spline-receiving grooves extending axially along the outside of said spindle snugly receiving the splines of said annular member and accommodating axial shifting of the spindle relative to said annular member, annular flange means projecting radially outwardly from said annular member, and fasteners fixedly securing together said annular member and said sleeve with said flange means abutting the end of said sleeve.

2. In a lathe having a lathe pedestal and an elongated power-driven and rotatable sleeve journaled on said pedestal, the improvement comprising an elongated chuck spindle mounted within said sleeve and shiftable axially relative to said sleeve, a bushing encircling said spindle and within said sleeve and centering the spindle within said sleeve, said bushing having integral axially extending splines distributed circumferentially about its interior, elongated spline-receiving grooves extending axially along the outside of said spindle and receiving the splines of said bushing and accommodating axial shifting of said spindle relative to said bushing, annular flange means projecting radially out from said bushing, and fastener means fixedly securing together said bushing and said sleeve with said flange means abutting an end of said sleeve.

3. The lathe of claim 2, where said sleeve has a chuck secured to said end of the sleeve and encircling said chuck spindle, said flange means has axially extending grooves distributed circumferentially thereabout, said one end of said sleeve has projections fitting within and extending axially within said grooves of said flange means, and said chuck has recesses receiving said projections of said sleeve with the projections operable to impart rotation from said sleeve to said chuck.

4. In a lathe, a pedestal, an elongated rotatable power-driven quill and means journaling the quill adjacent opposite ends on said pedestal, an elongated outer spindle and an elongated inner spindle axially shiftable relative to and mounted within said outer spindle, said inner and outer spindles being mounted within said quill with said outer spindle axially shiftable relative to said quill, bushing means encircling said outer spindle adjacent one end of and within the quill and centering said outer spindle within the quill, bushing means encircling said inner spindle adjacent one end of and within the outer spindle and centering said inner spindle within the outer spindle, each of said bushing means having plural splines integral therewith and distributed circumferentially about its interior, the bushing means encircling said outer spindle being fixed to said quill and said outer spindle having elongated axially extending grooves snugly receiving the splines of this bushing means whereby the quill and outer spindle rotate together, the bushing means encircling said inner spindle being fixed to said outer spindle and said inner spindle having elongated axially extending grooves snugly receiving the splines of this bushing means whereby the outer and inner spindles rotate together.

5. In a lathe having a pedestal and an elongated power-driven rotatable quill journaled on said pedestal, an elongated outer spindle and an elongated inner spindle axially shiftable relative to and mounted within said outer spindle, said inner and outer spindles being mounted within said quill with one set of ends protruding beyond one end of said quill and with the outer spindle axially shiftable relative to said quill, means interconnecting the quill and outer spindle for simultaneous rotation, chucks secured to the ends of said inner and outer spindles at said one set of ends, one to each end, and annular bushing means centering said inner spindle in said outer spindle at said one set of ends, said bushing means being detachably secured to said outer spindle, said bushing means having distributed about its interior axially extending splines integral therewith, said inner spindle having axially extending grooves receiving the splines of said bushing means, said splines and grooves being operable to impart the rotation of said outer spindle to said inner spindle.

6. The lathe of claim 5 wherein said bushing means has projections extending radially out therefrom, and wherein said outer spindle has axially extending projections fitted between the projections of said bushing means, and wherein the chuck secured to said outer spindle has recesses formed therein receiving the axially extending projections of said outer spindle.

7. In a double spindle construction having an outer spindle and an inner spindle within and extending axially along the outer spindle, an annular bushing centering an end of the inner spindle in an end of the outer spindle, said bushing having axially extending splines distibuted circumferentially about its interior, axial grooves in the inner spindle receiving said splines whereby the rotation of said bushing is imparted to the inner spindle, axial grooves in the periphery of said bushing, axially extending projections extending from said end of the outer spindle and fitting within said grooves in the periphery of said bushing and operable to impart the rotation of the outer spindle to said bushing, axial projections integral with said bushing underlying end portions of the projections of said outer spindle, and a chuck secured to said end of said outer spindle, said chuck having recesses receiving the projections of said bushing and the end portions of the projections of said outer spindle.

References Cited in the file of this patent
UNITED STATES PATENTS

| | | |
|---|---|---|
| 2,090,066 | Peterson | Aug. 17, 1937 |
| 2,703,847 | Kalikow | Mar. 8, 1955 |
| 2,959,202 | Springate | Nov. 8, 1960 |